July 23, 1940.    A. L. PARKER    2,209,133
VALVE ASSEMBLY
Filed March 17, 1938
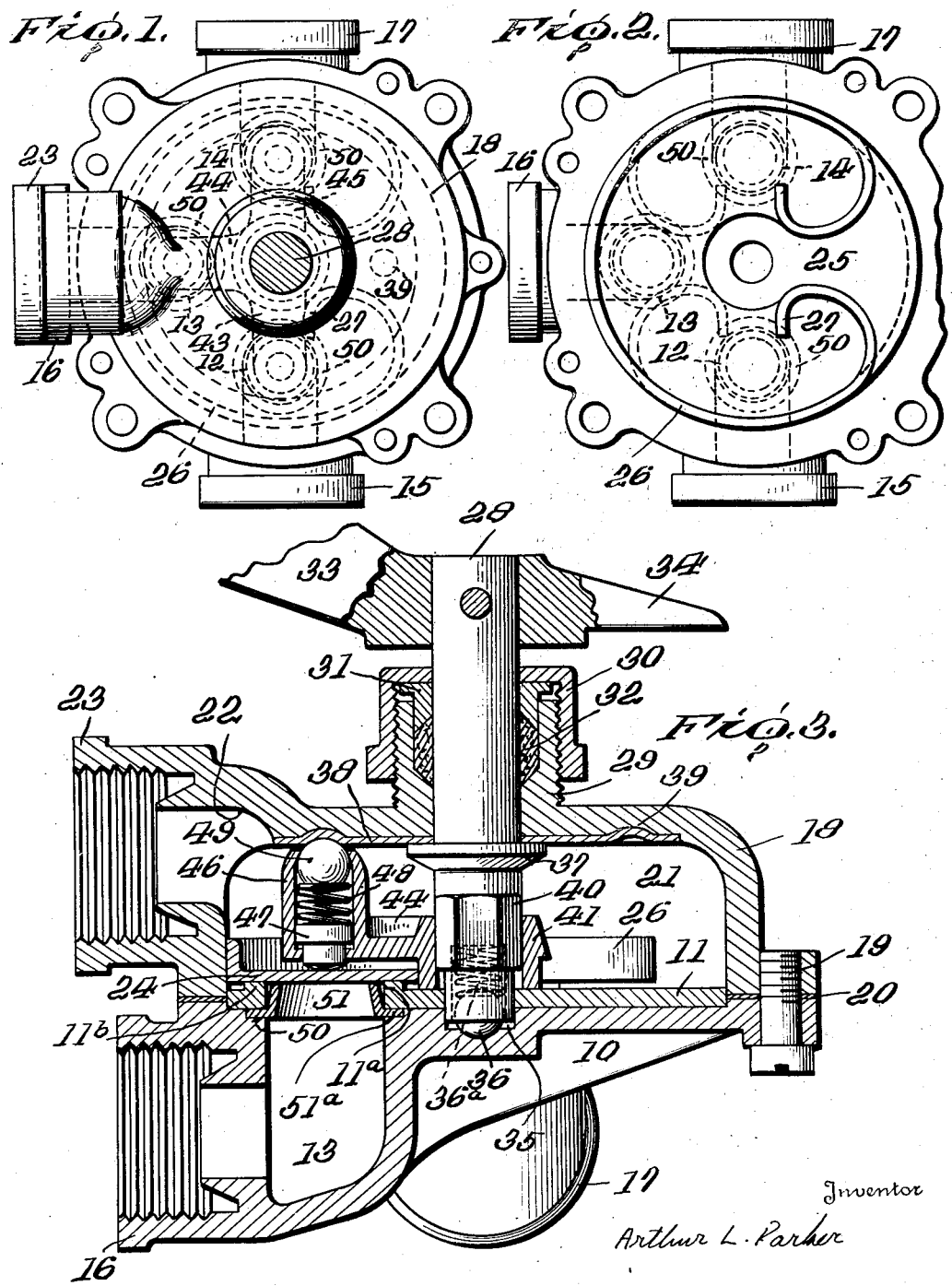
Inventor
Arthur L. Parker
By Watson & Parker
Attorneys Patented July 23, 1940

2,209,133

UNITED STATES PATENT OFFICE 2,209,133

VALVE ASSEMBLY

Arthur L. Parker, Cleveland, Ohio

Application March 17, 1938, Serial No. 196,538

10 Claims. (Cl. 251—84)

The present invention relates to new and useful improvements in a valve assembly, and more particularly to improvements in a valve assembly of the general type shown and described in Letters Patent No. 2,075,458, granted to me on March 30, 1937.

In the above prior patent, there is shown a valve assembly which is adapted to selectively control the passage of fluid through a plurality of ports. The valve assembly is one which is particularly adapted to selectively control the passage of fluid from a series of inlet ports to a single outlet port, or vice versa. The valve assembly includes generally a body having a seat member provided with a plurality of ports, and a chambered cap which is attached to the body and which covers the seat. The cap is provided with an outlet or discharge port and a valve member is disposed within the chamber defined by the cap and the body. This valve member is in the form of a disc rotatably mounted within the chamber for selectively controlling the passage of fluid through the ports. In the above patent, the valve disc is flexible and means are provided for turning the valve disc and for flexing the same centrally of the ports in the valve seats so as to afford a tight sealing contact. According to the present invention, the valve member is rigid and is rotated in substantially the same manner as shown in my aforesaid patent.

An object of the present invention is to provide a valve assembly of the above type, wherein flexible washers are disposed around each of the ports in the valve body for effecting a tight seal with the rigid valve member when the ports are closed.

A further object of the invention is to provide a valve assembly of the above type, wherein the flexible washers are held between a bottom plate and the valve body.

A still further object of the invention is to provide a valve assembly of the above type, wherein resilient means aid in maintaining the valve member in tight contact with the bottom plate, thus assuring that the washers will effect a tight seal therewith when the ports are closed.

The above and other objects of the invention will in part be obvious, and will be hereinafter more fully pointed out.

In the accompanying drawing:

Figure 1 is a top plan view of the improved valve assembly.

Figure 2 is a plan view showing the valve body with the cap removed, the full lines showing the position of the valve member when covering all of the ports, and the broken lines showing the position of the valve member when one of the ports is uncovered.

Figure 3 is a vertical section through the valve assembly of Figure 1.

The valve assembly, as shown in the illustrated embodiment of the invention, includes a body portion 10 which provides a seating surface for a plate 11 which extends across the body portion. The body portion 10 is provided with a plurality of inlet ports 12, 13, 14, which open through the seating surface. These ports communicate with internally threaded couplings 15, 16, 17, respectively, to which conduits may be attached. The conduits leading from these couplings are connected to separate tanks for supplying a fluid. A valve cap 18 is secured to the valve body 10 by means of bolts 19 or the like. A gasket 20 is disposed between the valve cap 18 and the body portion 10 to prevent leakage of fluid. The valve cap 18 defines a chamber between the top thereof and the plate 11. A port 22 leads from this chamber to an internally threaded coupling 23 to which an outlet pipe may be attached. This outlet pipe leads to the desired location where the fluid is to be delivered. The plate 11 is provided with openings 11a which register with the inlet ports.

Located within the chamber 21 is a valve member 24 in the form of a disc which is shaped to provide a space 25 which may be brought into register with one of the inlet ports so as to afford a free passage for the fluid from this port into the chamber 21. The valve member is provided with an integral flange 26 which extends around the periphery thereof and along the sides of the passage 25. The inner ends 27 of the flange extend outwardly and into the body of the valve member. The flange 26 serves to stiffen the valve member. The valve member contacts with the valve seat 11 and the flange 26 makes intimate contact with the inner wall of the cap 18.

A valve operating stem 28 extends centrally through the cap 18. The cap is provided with an integral upstanding sleeve portion 29 which surrounds the valve stem 28. The sleeve portion 29 is externally threaded to receive the threads on a packing cap 30 which bears against a packing follower 31. Disposed between the follower 31 and the lower portion of the sleeve 29 is a packing 32. Thus, the packing cap presses the follower against the packing material in order to provide a tight joint between the valve stem and the cap. The outer end of the valve stem is provided with an operating handle 33 which is preferably provided with a pointer 34 to indicate the setting of the valve member relative to the inlet ports.

The lower end of the valve stem, that is, the end which is disposed within the chamber 21, extends through the plate 11 and into a recess 35 in the valve body 10. This lower end of the valve stem 28 is internally bored to provide a housing for a spring-pressed ball 36 which contacts with a seat at the bottom of the recess 35. The valve stem 28 is provided with a flange 37 disposed within the chamber 21. The spring 36a bearing on the ball 36 tends to force the valve stem upwardly so that the flange 37 makes a tight turning fit with a plate 38. This plate 38 is suitably secured to the top of the valve cap 18 and is provided with recesses 39 which are spaced symmetrically with respect to the ports in the valve body 10.

A portion of the lower end of the valve stem 28 above the recess 35 is hexagonal in cross section, as indicated at 40. A hub 41 has the interior surface thereof similarly shaped, that is, hexagonally, and the hexagonal portion 49 of the valve stem 28 fits within the hub. Thus, rotation of the valve stem 28 will effect similar rotation of the hub 41. The hub carries three radially extending arms 43, 44, 45, which overlie the valve member 24. The ends of the radial arms are each provided with an upstanding sleeve 46, these sleeves being disposed substantially the same distance from the valve stem as the central axes of the inlet ports. A stud 47 is carried in the lower end of each sleeve and a spring 48 bears against the stud. In the upper end of each sleeve is a ball 49 against which the spring 48 also bears. Thus, the spring 48 tends to force the ball and the stud outwardly.

The inner ends 27 of the flange 26 on the valve member 24 engage the sides of the radial arms 43 and 45 so that rotation of the valve stem and the radial arms will effect corresponding rotation of the valve member 24. The valve body 10 is provided with recesses 50 around each of the inlet ports. A washer 51 is disposed around each of the inlet ports and has a flange portion 51a extending into the pockets or recesses 50 in the valve body. Thus, the plate 11 serves to maintain the washer 50 in place by securing the flange portions 51a thereof against the pockets 50 in the valve body. These washers 51 are resilient and flexible and are preferably made of Duprene. The body portion of each of the washers 51 is substantially frustro-conical in shape and extends upwardly through the ports 11a in the plate 11 and slightly inwardly into contact with the valve member 24, as shown in Figure 3. The valve member 24 is rotatable in contact with narrow seats 11b which project upwardly from the plate 11. The spring-pressed studs 47 tend to maintain the valve member 24 in contact with the elevated seats 11b, and the balls 49 enter the recesses 39 in the plate 38 so as to properly locate or position the valve member over the desired ports. Similarly, the spring pressure tends to maintain a limited downward pressure on the plate 11 so as to secure the flange portions of the washer in place.

When the valve member is in the position shown in Figures 1 and 3, the inlet ports 12, 13, 14, are closed. In this position of the valve member, fluid in the inlet ports is prevented from passing into the chamber 21. Thus, the pressure of the fluid in the inlet ports tends to expand the body portion of the washer 50 so that the edges thereof are forced into tight sealing contact with the valve member and the plate 11, so that a tight seal is provided entirely around the edges of all of the inlet ports.

When the valve stem 28 is rotated by manipulation of the handle 33, one of the inlet ports can be opened, as shown in Figure 2. In this position of the valve member, fluid entering through the inlet port 13 is permitted to pass through one of the ports in the plate 11 and the passage 25 into the chamber 21, and thence outwardly through the outlet or discharge port 22. Thus, the valve assembly is one which can selectively control the passage of fluid from any one of the inlet ports 12, 13, 14, to the outlet or discharge port 22, depending upon the position to which the valve member is shifted.

As indicated above, the washers 51 are preferably made of Duprene. Thus, the washers are made of a material which is rubber-like in nature and resilient. This material is highly resistant to hydrocarbon fuels and oils and is capable of flowing or being deformed without any substantial compression thereof. From the foregoing description, therefore, it will be seen that the spring-pressed studs 47 maintain the rigid valve member 24 in contact with the elevated seats 11b on the bottom plate 11. The resilient washers 51 are maintained in position around each of the inlet ports by the bottom plate 11 which holds the flanges 51a in position on the valve body 10. The body or sleeve portion of the washers are inclined inwardly and extend into contact with the under face of the valve member 24. Thus, when one or more of the inlet ports are closed, the pressure of the fluid in the inlet ports will force the sleeve portion of the washers outwardly into tight sealing contact with the valve member and the seats of the ports through the bottom plate 11. The inward inclination of the sleeve portion of the washers facilitates the turning of the valve member without cutting the washers or otherwise obstructing the rotation of the valve member.

In the accompanying drawing, one specific embodiment of the invention has been illustrated, but it is to be clearly understood that various changes in the details of construction and arrangement of parts may be made without departing from the scope of the invention as set forth in the appended claims.

I claim:

1. A valve assembly comprising a valve body having an inlet port therethrough, a chambered cap secured to said valve body and having an outlet port, a plate secured on said valve body within the chamber provided by said cap and having a port registering with said inlet port, a rotatable valve member disposed within said cap for controlling passage of fluid through the port in said plate, and a sealing washer having an annular flange secured between said plate and said valve body and a sleeve portion extending through the port in said plate into contact with said valve member, the sleeve portion of said washer adapted to be forced into tight sealing contact with the valve member by fluid pressure when the port is closed.

2. A valve assembly comprising a valve body having a plurality of inlet ports, a chambered cap secured to said valve body and having an outlet port, a plate secured on said valve body within the chamber provided by said cap and having a plurality of ports registering with said inlet ports, a rotatable valve member disposed within said cap and in contact with said plate for controlling the passage of fluid through the ports in said plate, and resilient sealing means secured around each of the ports in said plate and held between said plate and said valve body, said sealing means extending into contact with said valve member and adapted to be forced into tight sealing contact therewith by fluid pressure when one or more of the ports are closed.

3. A valve assembly comprising a valve body having a plurality of inlet ports, a chambered cap secured to said valve body and having an outlet port, a plate secured on said valve body within the chamber provided by said cap and having a plurality of ports registering with said inlet ports, a rotatable valve member disposed within said cap and in contact with said plate for controlling the passage of fluid through the ports in said plate, said valve body having recesses around the top of each of said inlet ports and a sealing washer associated with each of said inlet ports, each of said washers having an annular flange extending into the said recesses and held therein by said plate and a sleeve portion extending through the ports in said plate into contact with said valve member and adapted to be forced into tight sealing contact with the valve member by fluid pressure when the port is closed.

4. A valve assembly comprising a valve body having a plurality of inlet ports, a chambered cap secured to said valve body and having an outlet port, a plate secured on said valve body within the chamber provided by said cap and having a plurality of ports registering with said inlet ports, a rotatable valve member disposed within said cap and in contact with said plate for controlling the passage of fluid through the ports in said plate, and a resilient sealing washer associated with each of said inlet ports and each said sealing washer having an annular flange secured between said plate and said valve body and a sleeve portion tapering inwardly and extending through the ports in said plate into contact with said valve member and adapted to be forced outwardly into tight sealing contact with the said valve member by fluid pressure when the port is closed.

5. A valve assembly comprising a valve casing having a port therethrough, a rotatable valve member mounted within said casing for controlling the passage of fluid through said port, and a resilient sealing member secured around the inside of the port and extending through the port into contact with said valve member, said sealing member being normally spaced inwardly from the inner surface of the port beneath the valve member and adapted to be forced outwardly into tight sealing contact with the valve member and the adjacent inner surface of the port by fluid pressure when the port is closed.

6. A valve assembly comprising a valve casing having a port therethrough, means providing a valve seat around the port, a rotatable valve member mounted within said casing and contacting with said seat for controlling the passage of fluid through said port, and a resilient sealing member secured around the inside of said port beneath said valve seat and extending through the port and the valve seat into contact with said valve member, said sealing member being spaced inwardly from the inner surface of the valve seat beneath the valve member and adapted to be forced outwardly into tight sealing contact with the valve member and the inner surface of the seat by fluid pressure when the port is closed.

7. A valve assembly comprising a valve casing having a port therethrough, a rotatable valve member mounted within said casing for controlling the passage of fluid through said port, and a sealing washer secured around the inner surface of said port and having a frustro-conical sleeve portion extending through said port into contact with said valve member, said sleeve portion being spaced inwardly from the inner surface of the port beneath said valve member and adapted to be forced outwardly into tight sealing contact with the valve member and the adjacent inner surface of said port by fluid pressure when the port is closed.

8. A valve assembly comprising a valve casing having a port therethrough, a plate mounted within said casing and having an opening registering with said port, a rotatable valve member disposed within said casing and contacting with said plate for controlling the passage of fluid through said port and said opening, and resilient sealing means secured around the inner surface of said port between the plate and the valve casing and extending through the opening in said plate into contact with said valve member, said sealing means being spaced from the inner surface of the opening in said plate beneath said valve member and adapted to be forced outwardly into tight sealing contact therewith by fluid pressure when the port is closed.

9. A valve assembly comprising a valve casing having a port therethrough, a plate mounted within said casing and having an opening registering with said port, a rotatable valve member disposed within said casing and contacting with said plate for controlling the passage of fluid through said port and said opening, a sealing washer having an annular flange secured between said plate and the valve casing and having a frustro-conical sleeve portion extending through the opening in said plate into contact with said valve member, said sleeve portion being spaced inwardly from the inner surface of the opening in said plate beneath said valve member and adapted to be forced outwardly into tight sealing contact therewith by fluid pressure when the port is closed, and resilient means for maintaining said valve member in contact with said plate and for applying limited pressure to the plate for securing the annular flange of said sealing washer.

10. A valve assembly comprising a valve body having a port therethrough and an annular recess around the edge of said port, a chambered cap secured to said valve body and having a port therethrough, a plate mounted on said valve body and having an opening registering with the port in said valve body, said plate having a raised annular seat around the opening therethrough, a rotatable valve member disposed within said cap and contacting with the seat around the opening in said plate for controlling the passage of fluid therethrough, a sealing washer having an annular flange disposed in the recess in said valve body and held therein by said plate, said sealing washer having a frustro-conical sleeve portion extending through the opening in said plate into contact with said valve member and spaced inwardly from the inner surface of the opening in said plate beneath said valve member whereby it may be forced outwardly into tight sealing contact therewith by fluid pressure when the opening is closed, and resilient means for maintaining said valve member in contact with the seat on said plate and for applying limited pressure to said plate for securing the annular flange of said washer.

ARTHUR L. PARKER.